US008801358B2

(12) United States Patent
Küssner

(10) Patent No.: US 8,801,358 B2
(45) Date of Patent: Aug. 12, 2014

(54) METHOD AND LOADING SYSTEM FOR ORDER-PICKING ARTICLES ONTO DESTINATION LOAD CARRIERS

(75) Inventor: Martin Küssner, Leibnitz (AT)

(73) Assignee: Knapp AG, Hart bei Graz (AU)

( * ) Notice: Subject to any disclaimer, the term of this patent is extended or adjusted under 35 U.S.C. 154(b) by 216 days.

(21) Appl. No.: 13/376,467

(22) PCT Filed: Jul. 6, 2010

(86) PCT No.: PCT/EP2010/004069
§ 371 (c)(1),
(2), (4) Date: Dec. 6, 2011

(87) PCT Pub. No.: WO2011/006597
PCT Pub. Date: Jan. 20, 2011

(65) Prior Publication Data
US 2012/0097064 A1    Apr. 26, 2012

(30) Foreign Application Priority Data
Jul. 17, 2009 (DE) .......................... 10 2009 033 687

(51) Int. Cl.
*B65H 31/30* (2006.01)
(52) U.S. Cl.
USPC ................. 414/789.9; 414/789.6; 414/793.4; 414/793.8
(58) Field of Classification Search
USPC .......... 414/789.9, 788.4, 788.8, 788.9, 789.6, 414/790.5, 790.8, 792.7, 793.4, 793.8, 414/795.7, 797.4
See application file for complete search history.

(56) References Cited

U.S. PATENT DOCUMENTS

| | | | | |
|---|---|---|---|---|
| 4,073,388 A | * | 2/1978 | Carter | 414/796.7 |
| 4,189,273 A | | 2/1980 | Soderstrom et al. | |
| 5,102,282 A | * | 4/1992 | Maddox | 414/404 |
| 6,061,607 A | * | 5/2000 | Bradley et al. | 700/216 |
| 6,817,824 B2 | * | 11/2004 | Winkler | 414/273 |
| 2008/0199289 A1 | * | 8/2008 | Schafer | 414/404 |
| 2009/0136328 A1 | | 5/2009 | Schafer | |
| 2009/0139188 A1 | | 6/2009 | Schafer | |

FOREIGN PATENT DOCUMENTS

| | | |
|---|---|---|
| DE | 3814101 A1 | 11/1988 |
| DE | 102006025617 A1 | 11/2007 |
| DE | 102006025619 A1 | 11/2007 |
| DE | 202009009773 U1 | 9/2009 |
| EP | 2154088 A2 | 2/2010 |
| GB | 2017664 A | 10/1979 |
| WO | 2007/134832 A2 | 11/2007 |

* cited by examiner

*Primary Examiner* — Gregory Adams
*Assistant Examiner* — Lynn Schwenning
(74) *Attorney, Agent, or Firm* — McGlew and Tuttle, P.C.

(57) ABSTRACT

A method and loading system for order-picking articles in the form of individual articles and/or pack units, in which requested articles are packed, in accordance with the orders, onto destination load carriers and despatched. The requested articles (2) which are to be order-picked, in at least one order-picking station (4), are arranged and/or stacked in the pattern of the destination load carrier (3) on requested and transportable auxiliary load carriers (6), each provided for an order or part of an order. The auxiliary load carrier (6) together with a quantity of articles, provided as layers and/or stacks, to be conveyed to a loading station (5) is automatically transferred as a unit onto a placed-in-position destination load carrier (3) supplied, wherein preferably rolling containers and pallets are used as the destination load carriers.

15 Claims, 5 Drawing Sheets

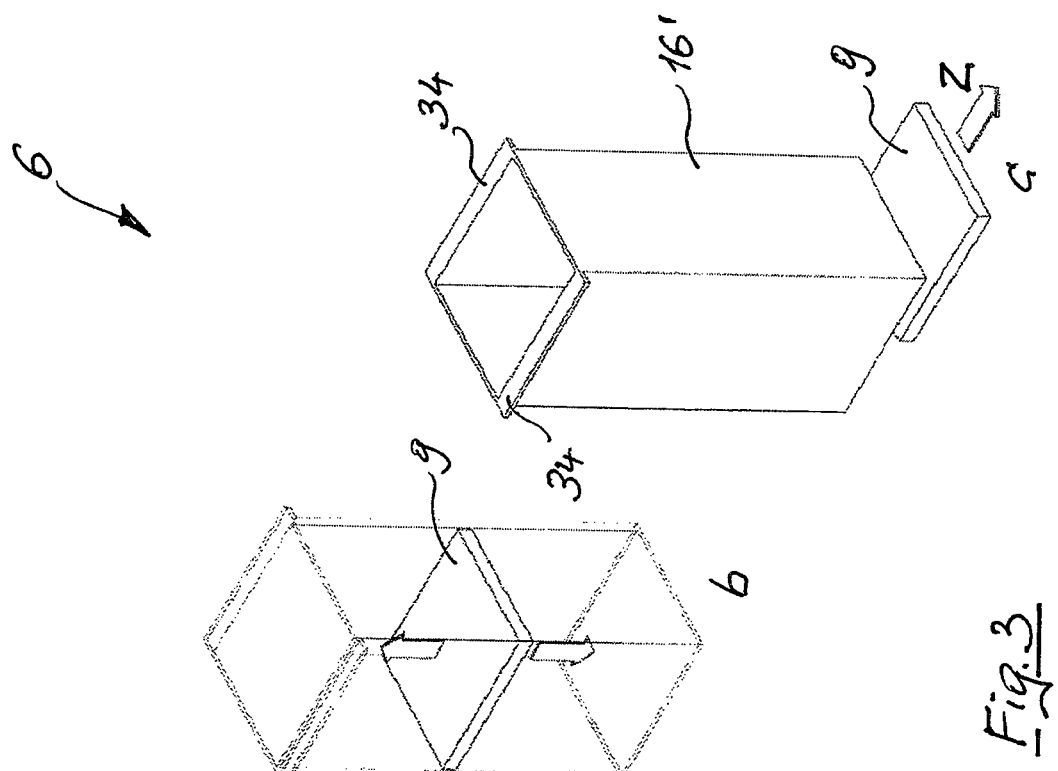
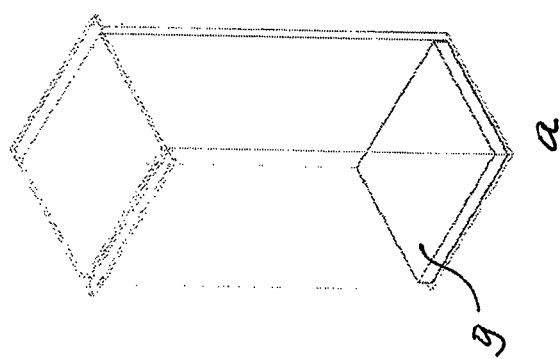

METHOD AND LOADING SYSTEM FOR ORDER-PICKING ARTICLES ONTO DESTINATION LOAD CARRIERS

CROSS REFERENCE TO RELATED APPLICATIONS

This application is a United States National Phase application of International Application PCT/EP2010/004069 and claims the benefit of priority under 35 U.S.C. §119 of German Patent Application DE 10 2009 033 687.7 filed Jul. 17, 2009, the entire contents of which are incorporated herein by reference.

FIELD OF THE INVENTION

The present invention pertains to a process and a loading system for commissioning articles in the form of single articles and/or packing units (parcels, etc.), in which conveyed articles are packed and shipped on targeted load carriers according to the commissioning orders.

BACKGROUND OF THE INVENTION

In loading systems of the above-mentioned type known, for example, from U.S. Pat. No. 4,189,273 or WO 2007/134832 A2, the targeted load carrier, especially in the form of a roll container, is loaded by the articles being stacked in a shaft, in which the targeted load carrier is located on a lifting means. The top side of the fixed shaft is located on a fixed, large-area working platform. A targeted load carrier is fed on a conveying means below the working platform, which is the commissioning space of the commissioner, and after loading, is fed on a same type of conveying means to the shipping area. A drawback is that roll containers and the like have to be conveyed on a special, expensive conveying means up to into the commissioning station, before these are loaded with articles and are conveyed again back into the shipping area on the special, expensive conveying means. Another drawback is that basically a large number of roll containers are bound in the loading system, and not only on the above-mentioned expensive conveying means during the conveying and releasing over wide tracks, but also during a still time-consuming loading at each of the many loading sites of the system.

SUMMARY OF THE INVENTION

The object of the present invention is to provide a process and loading system of the type mentioned in the introduction, which binds comparatively few targeted load carriers into the entire system with effective commissioning with simple means and especially makes a fast loading of the targeted load carriers possible.

The essence of the process according to the present invention is that the conveyed articles to be commissioned are already arranged and/or stacked in the loading pattern of the targeted load carrier in at least one commissioning station on conveyed, transportable auxiliary load carriers, which are each provided for a commissioning order or a part of a commissioning order, and the auxiliary load carrier together with quantity of articles consisting of layers and/or stack(s) is conveyed to a loading station, in which the quantity of articles is automatically reloaded as a unit onto a positioned targeted load carrier that has been kept ready, whereby preferably roll containers and pallets are used as the targeted load carriers. Roll containers with two opposed side walls that are parallel to one another, which lie laterally when conveying on the conveying means and preferably have a grid structure, are especially used here.

After an unloading, the auxiliary load carriers are especially automatically conveyed back into the commissioning station for a new loading on a returning conveying means.

In the loading station, the auxiliary load carrier together with a picked-up quantity of articles, which is conveyed on a feeding conveying means, is preferably gripped from below on the bottom side at a reloading site and transferred and positioned into a suspended position in a defined direction of transfer, and the bottom of a targeted load carrier that has been kept ready at the bottom side of the suspended auxiliary load carrier is lifted. Then, by means of a lateral shifting of the bottom of the suspended auxiliary load carrier in the direction of transfer, the quantity of articles is transferred to the targeted load carrier, whereupon the targeted load carrier together with the picked-up quantity of articles is moved downwards into a release position while separating from the auxiliary load carrier and is fed on a releasing conveying means to the shipping area.

The auxiliary load carrier together with quantity of articles that is gripped from below is especially lifted at the reloading site and offset in the direction of transfer horizontally up to a lateral stop and suspended in a fixed manner by lowering and positioned at the lateral stop.

The bottom, which is gripped from below, of the auxiliary load carrier suspended in a fixed manner is moved downwards from the actual auxiliary load carrier for a transfer of the quantity of articles onto the targeted load carrier and is displaced laterally in the direction of transfer, and after transfer of the quantity of articles onto the targeted load carrier and separation of the auxiliary load carrier from the targeted load carrier by the downward movement thereof, the bottom is again transferred back corresponding to the outward movement.

The empty auxiliary load carrier, which is suspended in a fixed manner, can be transferred back to the reloading site along the lines of the transfer in the direction of transfer for a conveying back on the returning conveying means to the commissioning station.

Preferably both single articles in the form of low-speed turners on elevated branch terminal lines and articles on height-adjustable pallets in the form of high-speed turners on a commissioning vehicle are fed to the commissioning station, whereby the single articles and the articles from the pallets are reloaded approximately on the same height level of the individual articles by a commissioner placed in an elevated position on the commissioning vehicle on provided auxiliary load carriers approximately at the same height level.

The commissioning vehicle with preferably two article pallets is automatically loaded on adjustable lifting tables, whereby the article pallets are preferably conveyed from a pallet bay storage.

A loading system according to the present invention is especially characterized by at least one commissioning station for the commissioning of conveyed articles on transportable auxiliary load carriers which are kept ready and which are each provided for a commissioning order or a part of a commissioning order, at least one loading station for an automatic transfer of a commissioned quantity of articles as one unit from the auxiliary load carrier to the targeted load carrier, as well as a feeding conveying track from the commissioning station to the loading station for the automatic transport of auxiliary load carriers with a quantity of articles arranged in layers and/or stacked, and a returning conveying track from the loading station to the commissioning station for automatic transporting back of auxiliary load carriers without quantity of articles for a new commissioning.

The auxiliary load carrier is especially a vertical shaft, which is open at the top and at the bottom, and preferably with a closed peripheral wall, in which a height-adjustable bottom is provided for a manual insertion of commissioned articles from above in layers and/or in stack(s), whereby the bottom, in a lowered position, can be pushed laterally out of the shaft for a release of the quantity of articles from the shaft and can be replaced again after emptying the quantity of articles.

The commissioning station has two spaced-apart rows of holding areas for conveyed and/or returned empty auxiliary load carriers, whereby a commissioning vehicle with a commissioner is displaceable in the aisle of the holding areas, on which commissioning vehicle preferably two picked-up, height-adjustable article pallets, and especially high-speed turners, are displaceable to the holding areas, whose articles can be commissioned by the commissioner on auxiliary load carriers, which are placed on the holding areas.

The article pallets are arranged on height-adjustable lifting tables, between which the commissioner commissions in an elevated position on the commissioning vehicle.

The commissioning vehicle can be displaced out of the aisle of the holding areas preferably in order to automatically take delivery of two article pallets from an article pallet feed track and in order to automatically release empty or partly commissioned pallets on a pallet releasing track.

The commissioning station has especially branch terminal lines at right angles to the holding area aisle, on which branch terminal lines single articles in the form of low-speed turners can be fed between two holding areas up to the holding area aisle approximately on the level of the upper end of an auxiliary load carrier and is accessible to a commissioner on the commissioning vehicle for a manual commissioning on the or in the auxiliary load carrier, which is preferably placed on a holding area adjacent to the branch terminal line.

For short conveying tracks of the targeted load carrier to the end consumer, the loading station of the targeted load carrier is especially arranged in the outgoing goods area, preferably in the shipping station.

The targeted load carriers are especially pallets or containers, and preferably roll containers, which have two to four side walls. If four side walls are provided, at least one side wall can be removed or folded down to be able to push out the displaceable bottom of the auxiliary load carrier from the actual auxiliary load carrier for a transfer of a quantity of articles to the bottom of the container.

The loading station of the loading system is especially characterized by a gripping and shifting unit with a forked load pickup means for gripping from below, transferring and positioning a conveyed auxiliary load carrier together with a picked-up quantity of articles on the feeding conveying track from a reloading site of the conveying track in a suspended position, as well as for returning an emptied auxiliary load carrier on the same path to the reloading site for a release to the commissioning station on the returning conveying track, a holding unit for the holding on the top side of the transferred auxiliary load carrier together with a quantity of articles in the suspended position, a lift for the lifting and positioning of a kept-ready, empty targeted load carrier at the bottom side of the suspended auxiliary load carrier, and a retaining device for a lateral stop and a positioning of an auxiliary load carrier together with a quantity of articles with a lateral shifting or removal of the bottom of the auxiliary load carrier for a transfer of the quantity of articles as a unit to the positioned, raised, targeted load carrier.

The number of the loading stations of the entire system can be reduced by the present invention. In existing systems, loading stations are susceptible to fault, especially when using roll containers as targeted load carriers, since these are preferably designed with two "wobbly" side walls, often jam, and a manual contact is necessary to eliminate the fault. Thus, by reducing the number of loading stations, the number of sites, at which faults can develop, is reduced. Only a small area has to be available for maintenance staff to eliminate the faults. The travel times of the maintenance staff and thus the downtimes due to the failure of a loading station are consequently reduced.

The loading system according to the present invention is especially suitable for food retail, by means of which the branches of a supermarket chain are supplied.

The loading system makes possible the commissioning of articles, which are supplied on goods receiving load carriers in the form of pallets, etc. and are shipped on targeted load carriers in the form of roll containers, pallets, etc.

For commissioning, articles are transported from storage sites in the storage facility (pallet bay, bay storage) to commissioning spaces.

A commissioner or storage facility worker loads an auxiliary load carrier with articles according to a commissioning order at the commissioning space. Articles are kept ready at the commissioning space either separately or on goods receiving load carriers (pallets).

As soon as the auxiliary load carrier is loaded according to a commissioning order, this auxiliary load carrier is transported from the commissioning space to a loading station, and especially a roll container loading station.

In the roll container loading station, the stack of articles is transferred from the auxiliary load carrier to the roll container. The auxiliary load carrier is again returned to the commissioning station. The roll container is further transported into the shipping area for the release of the articles.

In the system, an auxiliary load carrier is loaded at the commissioning station. Consequently, the system differs from the state of the art mentioned in the introduction. In prior-art systems, especially the targeted load carrier (pallet, roll container, etc.) is loaded directly by articles being stacked in a shaft, in which the targeted load carrier is located on a lifting means.

Moreover, the commissioning space in the prior-art systems is located on a fixed platform. In the system according to the present invention, the commissioning space is located on a vehicle.

By using the vehicle, travel times, which would arise due to the distribution of the articles to the targeted load carriers, are avoided, if the pallet is provided in a fixed manner, and the articles have to be distributed by the storage facility worker to the individual auxiliary load carriers.

By placing the commissioning space at the vehicle, the commissioning space, which affects the area, can be set up on a small space.

The separation of commissioning space and loading station according to the present invention reduces the number of roll container loading stations needed.

The use of the vehicle at the commissioning space reduces travel times during the reloading of articles from goods receiving load carriers to auxiliary load carriers in the commissioning process.

Further advantages and details of the present invention are described in detail below based on an exemplary embodiment with reference to the attached drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3 is a perspective view showing an auxiliary load carrier according to FIG. 2 with a height-adjustable bottom in three positions;

DESCRIPTION OF THE PREFERRED EMBODIMENTS

Figure 1:
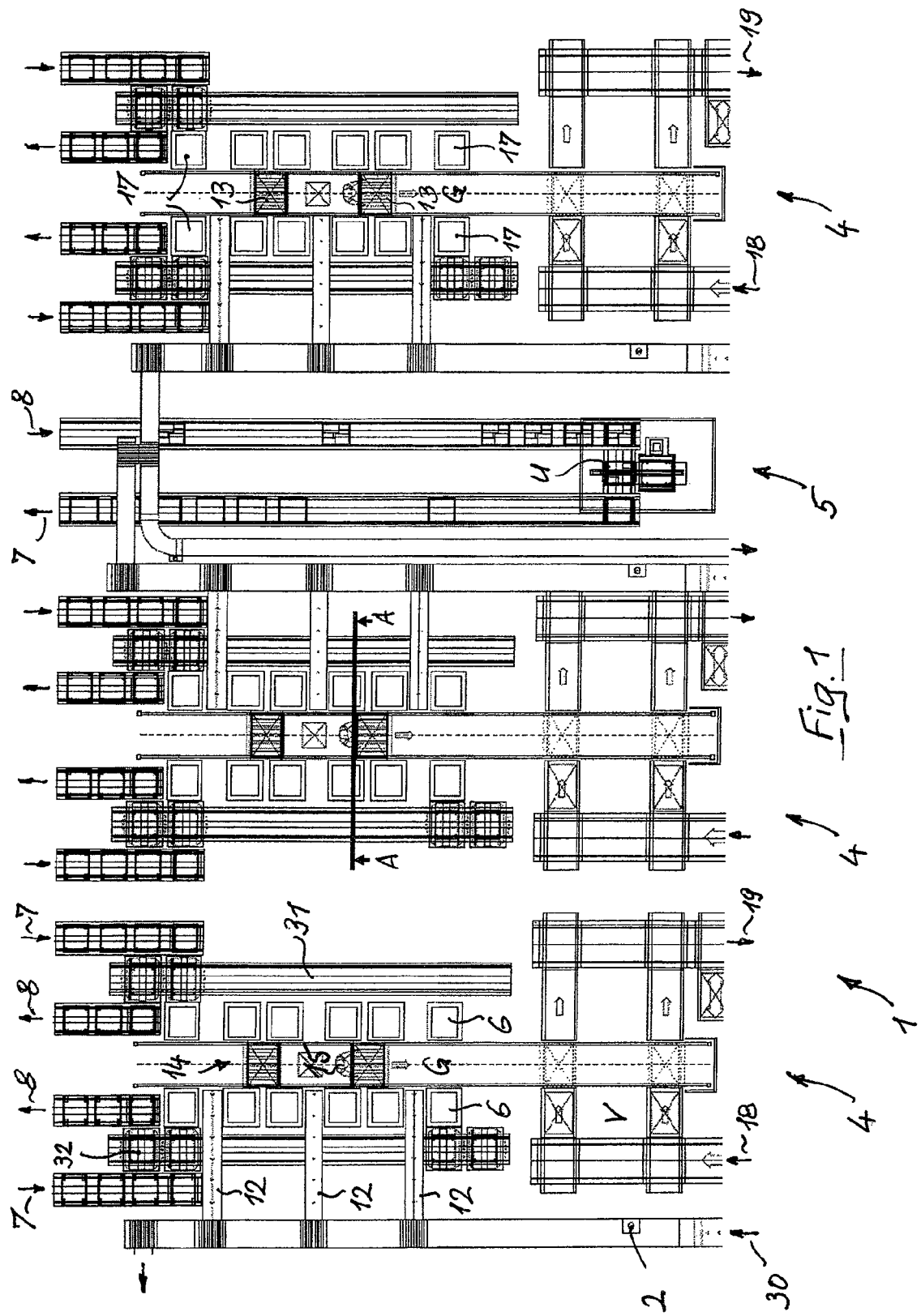
FIG. 1 is a schematic top view of a loading system according to the present invention with commissioning stations for auxiliary load carriers and a roll container loading station.

Referring to the drawings in particular, FIG. 1 shows a cutout of the commissioning area of a storage facility. The cutout comprises three commissioning stations 4 for the manual commissioning of articles 2 in auxiliary load carriers 6 and a loading station 5 for automatic loading of targeted load carriers 3 in the form of roll containers.

Each commissioning station 4 has a feeding conveying means 18 for articles 2, which are kept ready for commissioning on goods receiving load carriers in the form of pallets 13, as well as a feeding conveying means 30 for articles 2, which are kept ready separately in the commissioning station 4.

A commissioning vehicle 14, which has two holding areas, on which articles 2, which are stored on pallets 13, are picked up, is located at each commissioning space or each commissioning station 4.

Twelve holding areas 17 for auxiliary load carriers 6 are located at the commissioning space for the pickup articles 2 in the commissioning process, forming an aisle G for a commissioning vehicle 14.

Moreover, a conveying means 31 is located in the area of the commissioning space for providing and transporting away auxiliary load carriers 6 with a traversing cart 32 with two holding areas.

Articles 2 are transported from a storage site, especially a pallet bay storage L (not illustrated), on goods receiving load carriers or two pallets 13 via the conveying means 18 to the commissioning space. These are automatically transferred to the two holding areas of the commissioning vehicle 14 at the transfer site V.

After the commissioning process, the goods receiving load carriers are again transferred to the releasing conveying means 19 at the transfer site V.

After the transfer of the goods receiving load carrier to the commissioning vehicle 14, the vehicle moves in the aisle G along the auxiliary load carriers 6 that are kept ready. A storage facility worker or commissioner 15 removes the articles 2 from the goods receiving load carrier and transfers them to the auxiliary load carriers 6. The workplace of the storage facility worker is located on the commissioning vehicle 14.

In addition to the removal of articles from the goods receiving load carriers, which are located at the vehicle, the storage facility worker also removes articles 2 from the ramps or branch terminal lines 12 of the feeding conveying means 30 for articles 2 and puts these in the auxiliary load carrier 6.

After either an auxiliary load carrier 6 is fully loaded or the commissioning order is completed, the loaded auxiliary load carrier 6 is transferred to the traversing cart 32 and an empty auxiliary load carrier 6 is again made ready. The auxiliary load carrier 6 is then transported to the roll container loading station 5.

Figure 2:
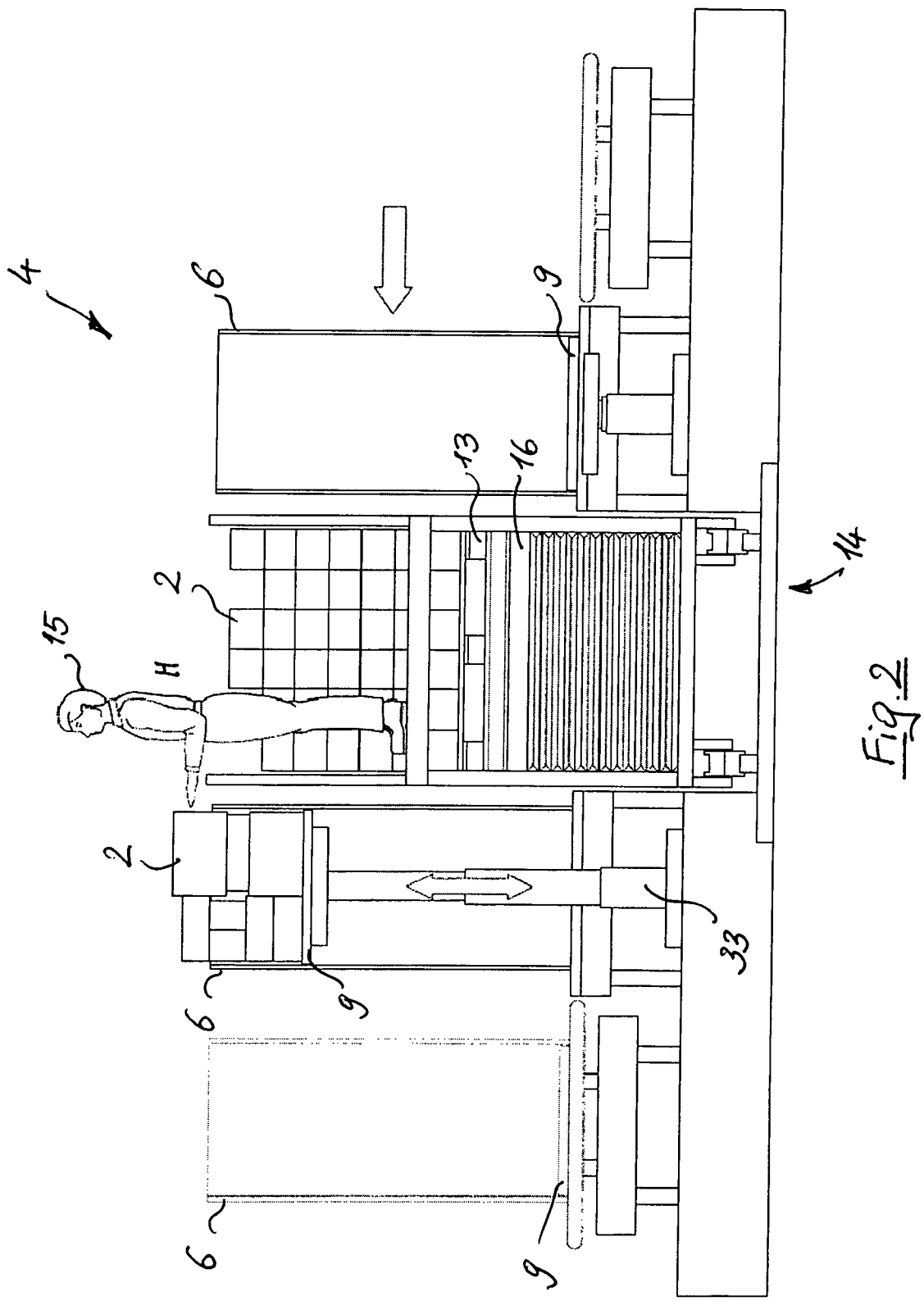
FIG. 2 is a sectional view A-A of FIG. 1 showing a commissioning station with auxiliary load carriers.

FIG. 2 shows the section A-A at the commissioning space. It shows an auxiliary load carrier 6 on the right side, which is empty and was just made ready via the conveying means 7 for auxiliary load carriers 6.

An auxiliary load carrier 6, which was partly loaded with articles 2 by the storage facility worker, is shown on the left side.

The commissioning vehicle 13, on which a goods receiving load carrier or a pallet 13 is placed and on which is located the workplace of the storage facility worker or commissioner 15, is illustrated in section A-A.

To make ergonomic work on an elevated level H possible for the storage facility worker, the goods receiving load carrier is placed on a lifting table 16. After layer after layer of articles 2 was removed from the goods receiving load carrier, this goods receiving load carrier is raised by the lifting table 16. Likewise, the bottom 9 of the auxiliary load carrier 6 is raised and lowered by a lift 33.

FIG. 3 shows the auxiliary load carrier 6 with the bottom 9 in three positions a, b and c. Besides the bottom 9 which is vertically adjustable and can be displaced laterally downwards, the auxiliary load carrier 6 has a peripheral edge 16', which is used as holding area for articles 2.

The bottom 9 is used for the reliable transport of the auxiliary load carrier 6 on the conveying means 7 and as a holding area for articles.

The peripheral wall 16 of the auxiliary load carrier 6 is closed on all sides and forms a vertical shaft that is open at the top and at the bottom. This makes possible the formation of a stack of articles.

The peripheral wall is provided with a profile 34 on the top side, so that the auxiliary load carrier 6 can be suspended in a holding unit 22 during the loading of the roll container in the roll container loading station 5.

Figure 4:
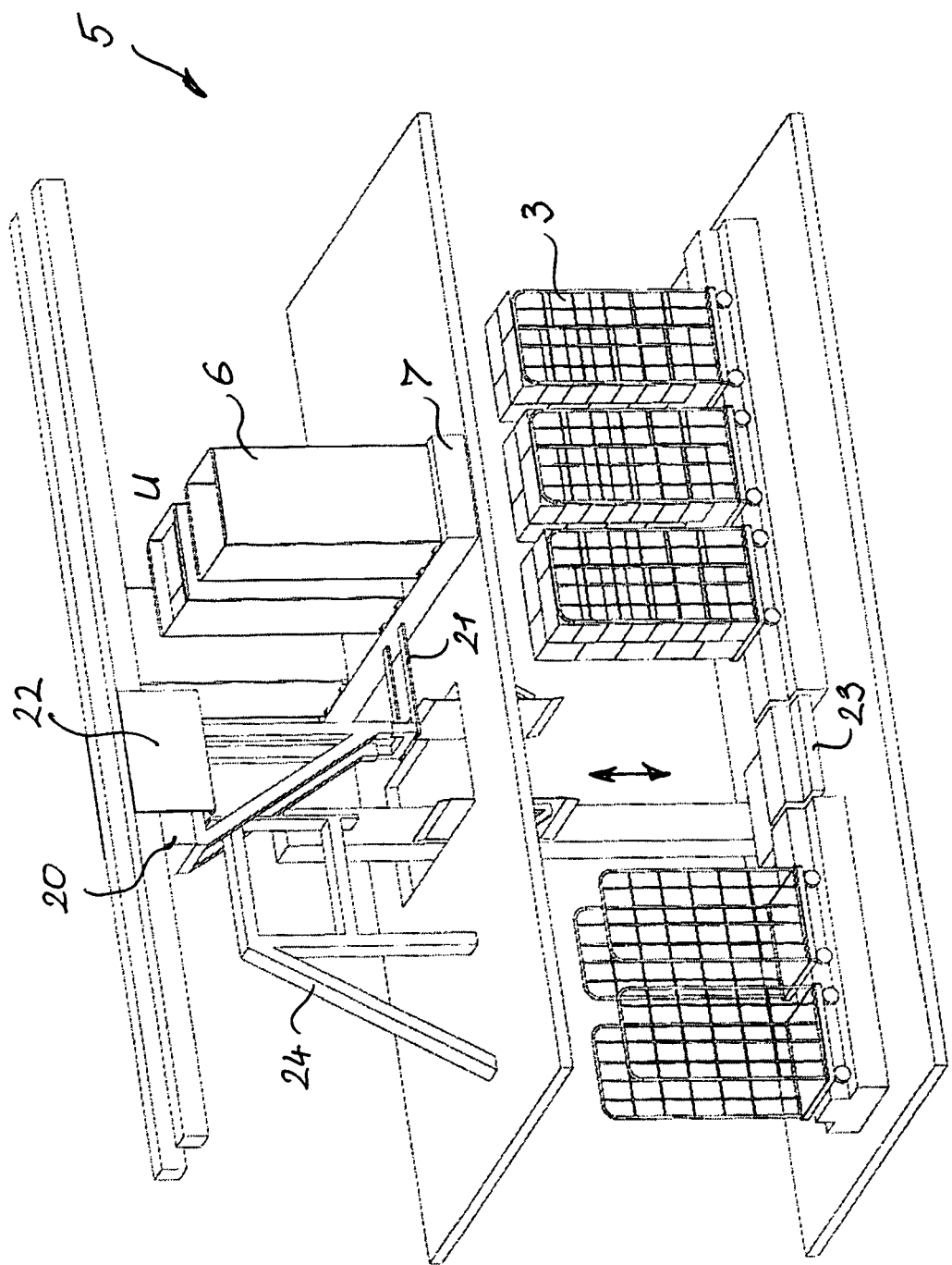
FIG. 4 is a perspective view showing the roll container loading station of FIG. 1 in one of two loading positions.
Figure 5:
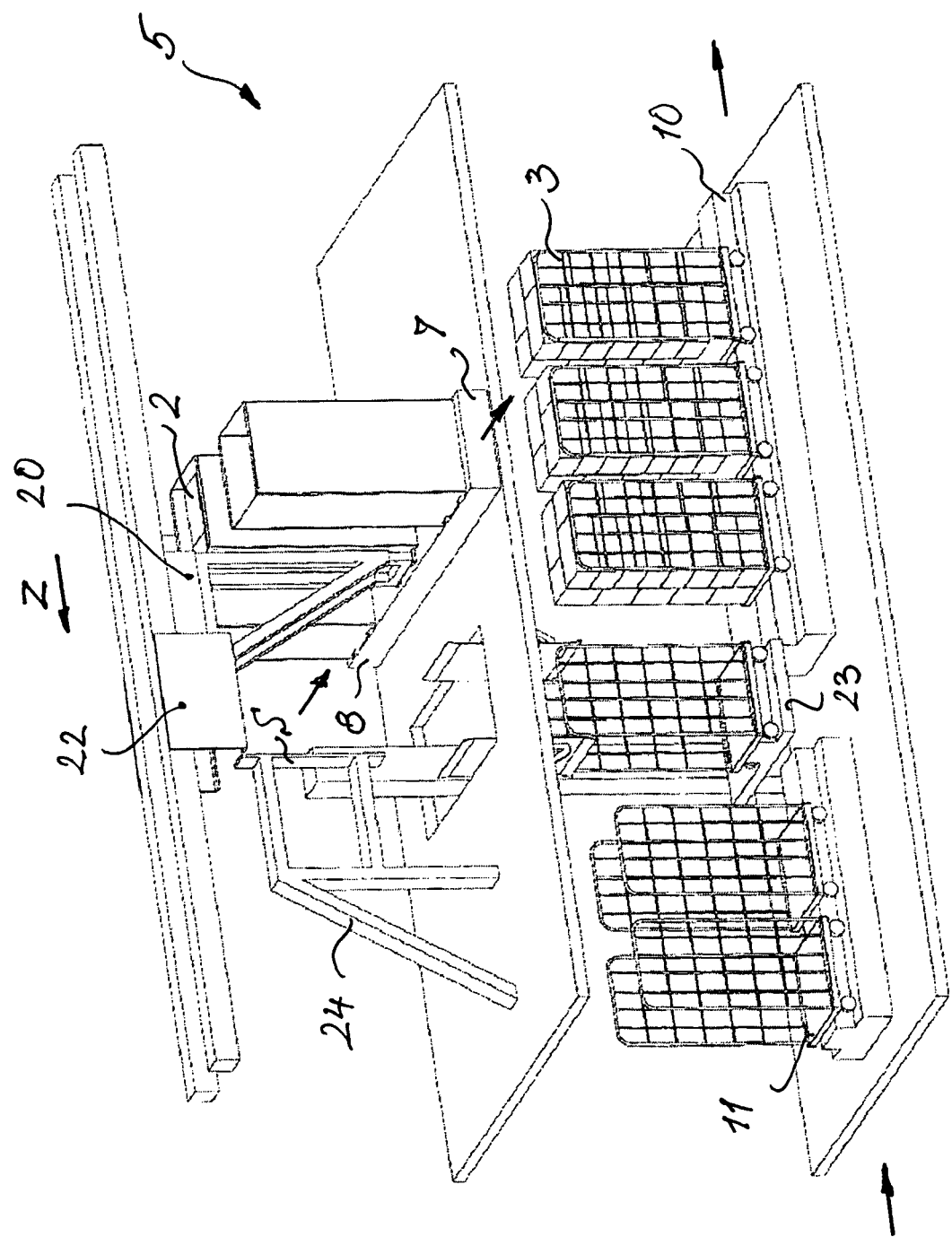
FIG. 5 is a perspective view showing the roll container loading station of FIG. 1 in another of two loading positions.

FIGS. 4 and 5 show the roll container loading station 5. The targeted load carriers 3, especially the empty roll containers, are kept ready on the lower plane. The auxiliary load carriers 6 of the feeding conveying track 8, which are loaded with articles, are kept ready on an upper plane.

The loading station 5 comprises a gripping and shifting unit 20, the above-mentioned holding unit 22, a retaining device 24, as well as a lift 23.

The auxiliary load carrier 6 is brought by means of the gripping and shifting unit 20 from feeding conveying means 8 into a transfer position or to a reloading site U.

For this purpose, the gripping and shifting unit 20 has a forked load pickup means 21, on which the auxiliary load carrier 6 is taken over. The load pickup means 21 lowers the bottom 9 of the auxiliary load carrier 6 in order to pick it up. Moreover, the load pickup means 21 is vertically displaceable in order to lift the auxiliary load carrier 6 from the conveying means 8.

The gripping and shifting unit 20 is horizontally displaceable in order to bring the auxiliary load carrier into a transfer position with stop S at the retaining device 24. Simultaneously with the pickup of the auxiliary load carrier 6, the targeted load carrier 3 is placed onto the platform of the lift 23 in order to bring this into the transfer position as well.

The auxiliary load carrier 6 is suspended at the holding unit 20 by lowering in its stop position S.

The lift 23 raises the empty targeted load carrier 3 until its bottom 11 is located directly under the bottom 9 of the auxiliary load carrier according to FIG. 3a. The two vertical walls of the targeted load carrier 3 are located outside the walls of the auxiliary load carrier 6.

Then the bottom 9 of the auxiliary load carrier 6 according to FIG. 3c is removed. To this end, the gripping and shifting unit 20 is shifted further to the left in the direction of transfer Z according to FIGS. 4 and 5. The stack of articles slides from the bottom 9 of the auxiliary load carrier 6 onto the bottom 11 of the targeted load carrier 3.

After removal of the bottom 9 of the auxiliary load carrier 6, the targeted load carrier 3, on which the stack of articles is now located, is lowered with the lift 23. If this has arrived at the lower plane, the targeted load carrier 3 together with a stack of articles is transferred onto a releasing conveying track 10 in the direction of shipping.

The bottom 9 of the auxiliary load carrier is brought by the shifting and gripping unit 20 again into the original position under the wall of the auxiliary load carrier 6, which is still located at the transfer station. By means of a raising of the load pickup means 21 of the gripping and shifting unit 20, the bottom is again connected to the peripheral wall 16 of the auxiliary load carrier 6 and then the empty auxiliary load carrier is transferred by the gripping and shifting unit 20 against the direction of transfer Z again into the transfer station U and returned on the releasing conveying means 7 to the commissioning station 4 according to FIG. 1 for a refilling with articles 2.

While specific embodiments of the invention have been described in detail to illustrate the application of the principles of the invention, it will be understood that the invention may be embodied otherwise without departing from such principles.

The invention claimed is:

1. A process for commissioning articles in the form of single articles and/or packing units, the process comprising the steps of:
   conveying articles wherein the conveyed articles are packed and shipped on targeted load carriers according to commissioning orders;
   arranging and/or stacking the conveyed articles to be commissioned in at least one commissioning station on conveyed, transportable auxiliary load carriers, which are each provided for a commissioning order or a part of a commissioning order, in the loading pattern of the targeted load carrier;
   conveying the auxiliary load carrier together with the quantity of articles from layers and/or stack(s) to a loading station, in which the quantity of articles is automatically reloaded as a unit on a positioned targeted load carrier that is kept ready;
   conveying, in the loading station, the auxiliary load carrier on a feeding conveying means;
   gripping the auxiliary load carrier, together with a picked-up quantity of articles from below on an underside at a reloading site and transferring and positioning the auxiliary load carrier, together with a picked-up quantity of articles into a suspended position in a defined direction of transfer;
   raising a bottom of a provided targeted load carrier; and
   transferring the quantity of articles onto the targeted load carrier by means of lateral shifting of a bottom of the suspended auxiliary load carrier in the direction of transfer and moving the quantity of articles together with the targeted load carrier, while separating the quantity of articles from the auxiliary load carrier, downwards into a releasing position and feeding the quantity of articles to the shipping area on a releasing conveying means.

2. A process in accordance with claim 1, wherein unloaded auxiliary load carriers are automatically conveyed back for a reloading onto a returning conveying means into the commissioning station.

3. A process in accordance with claim 1, wherein the auxiliary load carrier together with a quantity of articles gripped from below is lifted to the reloading site and offset in the direction of transfer horizontally up to a lateral stop and is suspended in a fixed manner by lowering and is positioned at the lateral stop.

4. A process in accordance with claim 1, wherein the bottom, which is gripped from below, of the auxiliary load carrier suspended in a fixed manner is moved from the actual auxiliary load carrier for a transfer of the quantity of articles onto the targeted load carrier and is displaced laterally in the direction of transfer, and after transfer of the quantity of articles onto the targeted load carrier and separation of the auxiliary load carrier from the targeted load carrier by the downward movement thereof, the bottom is again transferred back corresponding to the outward movement.

5. A process in accordance with claim 1, wherein the empty auxiliary load carrier which is suspended in a fixed manner is transferred back to the reloading site along the lines of the transfer in the direction of transfer for a conveying back on the returning conveying means to the commissioning station.

6. A process in accordance with claim 1, wherein both single articles on elevated branch terminal lines and articles on height-adjustable pallets on a commissioning vehicle are fed to the commissioning station, whereby the single articles and the articles from the pallets are reloaded approximately on the same height level of the individual articles by a commissioner placed in an elevated position on the commissioning vehicle on provided auxiliary load carriers approximately at the same height level.

7. A process in accordance with claim 6, wherein the commissioning vehicle with two article pallets is automatically loaded on adjustable lifting tables, whereby the article pallets are preferably conveyed from a pallet bay storage.

8. A loading system for commissioning articles in the form of single articles and/or packing units, in which conveyed articles are packed on targeted load carriers and shipped according to the commissioning orders, the system comprising:
   at least one commissioning station for the commissioning of conveyed articles on transportable auxiliary load carriers, which are kept ready and which are each provided for a commissioning order or a part of a commissioning order;

at least one loading station for an automatic transfer of a commissioned quantity of articles as one unit from the auxiliary load carrier to the targeted load carrier;

a feeding conveying track from the commissioning station to the loading station for the automatic transport of auxiliary load carriers with a quantity of articles arranged in layers and/or stacked;

a returning conveying track from the loading station to the commissioning station for the automatic transporting back of auxiliary load carriers without the quantity of articles for a new commissioning; and a loading station comprising:
- a gripping and shifting unit with a forked load pickup means for gripping from below, transferring and positioning a conveyed auxiliary load carrier together with a picked-up quantity of articles on the feeding conveying track from a reloading site of the conveying track in a suspended position, as well as for returning the emptied auxiliary load carrier on the same path to the reloading site for releasing to the commissioning station on the returning conveying track;
- a holding unit for the holding on the top side of the transferred auxiliary load carrier together with a quantity of articles in the suspended position;
- a lift for the lifting and positioning of a kept-ready, empty targeted load carrier at the bottom side of the suspended auxiliary load carrier; and
- a retaining device for a lateral stop and positioning of an auxiliary load carrier together with a quantity of articles with a lateral shifting or removal of the bottom of the auxiliary load carrier for a transfer of the quantity of articles as a unit to the positioned, raised, targeted load carrier.

9. A loading system in accordance with claim 8, wherein the auxiliary load carrier is a vertical shaft, which is open at the top and at the bottom, and with a closed peripheral wall, in which a height-adjustable bottom is provided for a manual insertion of commissioned articles from above in layers and/or in stack, whereby the bottom, in a lowered position, can be pushed laterally out of the shaft for a release of the quantity of articles from the shaft and can be replaced again after emptying the quantity of articles.

10. A loading system in accordance with claim 8, wherein the commissioning station has two spaced-apart rows of holding areas for conveyed and/or returned empty auxiliary load carriers, wherein a commissioning vehicle with commissioner is displaceable in the aisle of the holding areas, on which two picked-up, height-adjustable article pallets are displaceable to the holding areas, whose articles can be commissioned by the commissioner on auxiliary load carriers, which are placed on the holding areas.

11. A loading system in accordance with claim 10, wherein the article pallets are arranged on height-adjustable lifting tables, between which the commissioner commissions in an elevated position on the commissioning vehicle.

12. A loading system in accordance with claim 10, wherein the commissioning vehicle is displaceable out of the aisle of the holding areas in order to automatically take delivery of two article pallets from an article pallet feed track and in order to automatically release empty or partly-commissioned pallets on a pallet releasing track.

13. A loading system in accordance with claim 10, wherein the commissioning station has branch terminal lines at right angles to the aisle of holding areas.

14. A loading system in accordance with claim 8, wherein the loading station of the targeted load carrier is arranged in the shipping station.

15. A loading system in accordance with claim 8, wherein the targeted load carriers are pallets or containers, and roll containers.

* * * * *